(12) United States Patent
Sarferaz

(10) Patent No.: US 12,039,416 B2
(45) Date of Patent: Jul. 16, 2024

(54) FACILITATING MACHINE LEARNING USING REMOTE DATA

(71) Applicant: SAP SE, Walldorf (DE)

(72) Inventor: Siar Sarferaz, Heidelberg (DE)

(73) Assignee: SAP SE, Walldorf (DE)

(*) Notice: Subject to any disclaimer, the term of this patent is extended or adjusted under 35 U.S.C. 154(b) by 895 days.

(21) Appl. No.: 16/797,835

(22) Filed: Feb. 21, 2020

(65) Prior Publication Data
US 2021/0264312 A1  Aug. 26, 2021

(51) Int. Cl.
*G06F 16/00* (2019.01)
*G06F 16/2458* (2019.01)
*G06F 16/25* (2019.01)
*G06F 16/28* (2019.01)
*G06F 16/332* (2019.01)
(Continued)

(52) U.S. Cl.
CPC ......... *G06N 20/00* (2019.01); *G06F 16/2465* (2019.01); *G06F 16/254* (2019.01); *G06F 16/284* (2019.01); *G06F 16/3329* (2019.01); *G06F 16/353* (2019.01); *G06F 16/9027* (2019.01); *G06F 16/906* (2019.01); *G06F 16/9535* (2019.01); *G06N 5/04* (2013.01)

(58) Field of Classification Search
CPC ...... G06N 20/00; G06N 20/20; G06N 3/0445; G06N 3/088; G06N 3/084; G06N 3/0454; G06N 3/0481; G06N 5/027; G06N 5/048; G06F 16/9027; G06F 16/2465; G06F 16/906; G06F 16/353; G06F 16/3329; G06F 16/5854; G06F 16/9535; G06F 16/955
See application file for complete search history.

(56) References Cited

U.S. PATENT DOCUMENTS 8,356,046 B2  1/2013  Hille-Doering et al.
8,856,676 B1  10/2014  Starenky et al.
(Continued)

FOREIGN PATENT DOCUMENTS

WO  WO 2015067087       5/2015
WO  WO2018017467 A1 *  1/2018
(Continued)

OTHER PUBLICATIONS

Zhiqiang Gong et al., "Diversity in Machine Learning", IEEE Access, vol. 7, May 17, 2019, pp. 64323-64350.*
(Continued)

*Primary Examiner* — Srirama Channavajjala
(74) *Attorney, Agent, or Firm* — Klarquist Sparkman, LLP

(57) ABSTRACT

Techniques and solutions are described for facilitating the use of machine learning techniques. In some cases, a system suitable for providing a machine learning analysis can be different from a remote computer system on which training data for a machine learning model is located. A machine learning task can be defined that includes an identifier for at least one data source on the remote computer system. Data for the at least one data source is received from the remote computer system. At least a portion of the data is processed using a machine learning algorithm to provide a trained model, which can be stored for later use. Data on the remote computing system can be unstructured or structured. Particularly in the case of structured data, a remote computer system can make updated data available to the machine learning task.

17 Claims, 13 Drawing Sheets

(51) Int. Cl.
<table>
<tr><td>G06F 16/35</td><td>(2019.01)</td></tr>
<tr><td>G06F 16/901</td><td>(2019.01)</td></tr>
<tr><td>G06F 16/906</td><td>(2019.01)</td></tr>
<tr><td>G06F 16/9535</td><td>(2019.01)</td></tr>
<tr><td>G06N 5/04</td><td>(2023.01)</td></tr>
<tr><td>G06N 20/00</td><td>(2019.01)</td></tr>
</table>

(56) References Cited

U.S. PATENT DOCUMENTS

| | | | |
|---|---|---|---|
| 9,058,317 | B1* | 6/2015 | Gardner ............... G06F 40/268 |
| 2003/0212544 | A1* | 11/2003 | Acero .................. G06F 40/30 704/9 |
| 2007/0061701 | A1 | 3/2007 | Thieberger et al. |
| 2015/0379429 | A1 | 12/2015 | Lee et al. |
| 2016/0092786 | A1 | 3/2016 | Mehanna et al. |
| 2017/0185242 | A1 | 6/2017 | Jann et al. |
| 2017/0329466 | A1 | 11/2017 | Krenkler et al. |
| 2018/0136332 | A1* | 5/2018 | Barfield, Jr. ......... G01S 7/4802 |
| 2018/0285777 | A1 | 10/2018 | Li et al. |
| 2019/0073293 | A1* | 3/2019 | Sharma ................ G06F 16/22 |
| 2019/0147361 | A1* | 5/2019 | Matsumoto ........... G06N 99/00 706/12 |
| 2019/0156216 | A1 | 5/2019 | Gupta et al. |
| 2019/0188251 | A1 | 6/2019 | Liu et al. |
| 2019/0325333 | A1 | 10/2019 | Chan et al. |
| 2019/0332895 | A1* | 10/2019 | Anghel ............... H04L 43/0876 |
| 2019/0391956 | A1* | 12/2019 | Kozhaya ............. G06F 9/44521 |
| 2020/0184380 | A1* | 6/2020 | Thomas ................ G06N 3/063 |
| 2020/0311573 | A1* | 10/2020 | Desai .................... G06N 20/10 |
| 2021/0042290 | A1* | 2/2021 | Banipal ............... G06F 16/2365 |
| 2021/0042657 | A1* | 2/2021 | Tiruveedhula .......... G10L 15/26 |
| 2021/0056164 | A1* | 2/2021 | Mustafi ................ G06V 10/82 |
| 2021/0117775 | A1* | 4/2021 | Zlotnick .............. G06K 9/6259 |
| 2021/0182698 | A1 | 6/2021 | Biannic et al. |
| 2021/0192283 | A1* | 6/2021 | Guo .................... G06K 9/6263 |
| 2021/0192376 | A1 | 6/2021 | Sarferaz et al. |
| 2021/0209501 | A1* | 7/2021 | Sarferaz .............. G06K 9/6282 |
| 2021/0216904 | A1* | 7/2021 | Khurana ................ G06N 3/082 |
| 2021/0216912 | A1* | 7/2021 | Haase-Schuetz .... G06K 9/6277 |
| 2021/0312317 | A1 | 10/2021 | Sarferaz et al. |
| 2021/0342738 | A1 | 11/2021 | Sarferaz et al. |

FOREIGN PATENT DOCUMENTS

| WO | WO2018217903 A1 * | 11/2018 |
|---|---|---|
| WO | WO2021050391 A1 * | 3/2021 |

OTHER PUBLICATIONS

Extended European Search Report received in related European Patent Application No. 20215206.2, Jun. 18, 2021, 11 pages.

Scholbeck et al., "Sampling Intervention, Prediction, Aggregation: A Generalized Framework for Model-Agnostic Interpretations," arxiv.org, Cornell University Library, 201 Olin Library Cornell University, Ithaca, NY, Apr. 8, 2019, 12 pages.

Extended European Search Report received in related European Patent Application No. 202133625, May 21, 2021, 13 pages.

Cohen et al., "Feature Selection Based on the Shapley Value," IJCAI '05: Proceedings of the 19$^{th}$ International Joint Conference on Artificial Intelligence, Jul. 1, 2005, pp. 665-670.

Lin Chin-Fang, "Application-grounded evaluation of predictive model explanation methods," Master Thesis—Department of Mathematics and Computer Science Data Mining Research Group, Sep. 24, 2018, pp. 1-57. Retrieved from the Internet: https://pure.tue.nl/ws/portalfiles/portal/109407025/CSE667_master_thesis_C_Lin_final_version.pdf.

Messalas Andreas et al., "Model-Agnostic Interpretability with Shapley Values," 2019 10$^{th}$ International Conference on Informational Intelligence, Systems and Applications, (IISA), IEEE, Jul. 15, 2019, pp. 1-7.

Ben-Hur et al., "A User's Guide to Support Vector Machines," http://pyml.sourceforge.net/doc/howto.pdf, at least as early as May 1, 2020, 18 pages.

Jain, "Simple Tutorial on SVM and Parameter Tuning in Python and R," https://www.hackerearth.com/blog/developers/simple-tutorial-svm-parameter-tuning-python-r/, Feb. 21, 2017, 10 pages.

"Types of Machine Learning Algorithms You Should Know," https://towardsdatascience.com/types-of-machine-learning-algorithms-you-should-know-953a08248861?gi=1228b51fc8a3, Jun. 15, 2017, 8 pages.

Interpreting random forests, https://blog.datadive.net/interpreting-random-forests/, Oct. 1, 2014, 16 pages.

Sidana, "Intro to types of classification algorithms in Machine Learning," https://medium.com/sifium/machine-learning-types-of-classification-9497bd4f2e14, Feb. 28, 2017, 5 pages.

Applying Multinomial Naïve Bayes to NLP Problems: A Practical Explanation, https://medium.com/syncedreview/applying-multinomial-naive-bayes-to-nlp-problems-a-practical-explanation-4f5271768ebf, Jul. 17, 2017, 9 pages.

Ray, "6 Easy Steps to Learn Naïve Bayes Algorithm with codes in Python and R," https://www.analyticsvidhya.com/blog/2017/09/naive-bayes-explained/, Sep. 11, 2017, 26 pages.

Naïve Bayes classifier for multinomial models, https://scikit-learn.org/stable/modules/generated/sklearn.naive_bayes.MultinomialNB.html#sklearn.naive_bayes.MultinomialNB, at least as early as May 1, 2020, 5 pages.

Lundberg et al., "Consistent Individualized Feature Attribution for Tree Ensembles," https://arxiv.org/pdf/1802.03888.pdf, Mar. 7, 2019, 9 pages.

Simpson's paradox, Wikipedia, https://en.wikipedia.org/wiki/Simpson%27s_paradox, at least as early as May 1, 2020, 6 pages.

Strings as features in decision tree/random forest, machine learning—strings as features in decision tree/random forest—Data Science Stack Exchange, at least as early as May 1, 2020, 6 pages.

Mutual information, Wikipedia, https://en.wikipedia.org/wiki/Mutual_information, at least as early as May 1, 2020, 10 pages.

Kratzer et al., "varrank: An R Package for Variable Ranking Based on Mutual Information with Applications to Systems Epidemiology," https://www.math.uzh.ch/pages/varrank/articles/varrank.html, Jan. 29, 2020, 27 pages.

Ribeiro et al., "Why Should I Trust You?" Explaining the Predictions of Any Classifier, https://arxiv.org/pdf/1602.04938.pdf, Aug. 9, 2016, 10 pages.

Basic classification: Classify images of clothing, https://www.tensorflow.org/tutorials/keras/classification, at least as early as May 1, 2020, 17 pages.

Nishida, "Finding Variable Importance with Random Forest & Boruta," https://blog.exploratory.io/finding-variable-importance-with-random-forest-boruta-28badd116197?gi=8b6a24a3a90a, Sep. 27, 2019, 9 pages.

Brownlee, "Linear Regression for Machine Learning," https://machinelearningmastery.com/linear-regression-for-machine-learning/, Mar. 25, 2016, 28 pages.

Cross-validation(statistics), Wikipedia, https://en.wikipedia.org/wiki/Cross-validation_(statistics), at least as early as May 1, 2020, 12 pages.

Brownlee, "What is the Difference Between a Parameter and a Hyperparameter?" https://machinelearningmastery.com/difference-between-a-parameter-and-a-hyperparameter/, Jul. 26, 2017, 29 pages.

Parkinson, "SAP Data Intelligence: Create your first AutoML Scenario," https://blogs.sap.com/2019/12/18/sap-data-intelligence-create-your-first-automl-scenario/, Dec. 18, 2019, 16 pages.

"Input Field," retrieved from: https://experience.sap.com/fiori-design-web/input-field/, Feb. 4, 2019, 29 pages.

Berger, S/4 Embedded Analytics—The Virtual Data Model, https://blogs.sap.com/2018/03/19/s4-embedded-analytics-the-virtual-data-model/, Mar. 19, 2018, 17 pages.

Data Modelling: Conceptual, Logical, Physical Data Model Types, https://www.guru99.com/data-modelling-conceptual-logical.html, at least as early as Feb. 21, 2020, 11 pages.

(56) References Cited

OTHER PUBLICATIONS

Information About Data Transfer via ODP from ABAP CDS Views, https://help.sap.com/viewer/ccc9cdbdc6cd4eceafle5485b1bf8f4b/7.5.9/en-US/af11a5cb6d2e4d4f90d344f58fa0fb1d.html, at least as early as Feb. 21, 2020, 2 pages.
Transferring Data from SAP Systems via ODP (ABAP CDS Views), https://help.sap.com/viewer/107a6e8a38b74ede94c833ca3b7b6f51/1.0.7/en-US/af11a5cb6d2e4d4f90d344f58fa0fb1d.html, at least as early as Feb. 21, 2020, 2 pages.
Rodoplu, How to Create Delta Extraction Based ABAP CDS Views, https://blogs.sap.com/2018/10/31/how-to-create-delta-extraction-based-abap-cds-views/, Oct. 31, 2018, 10 pages.
CDS based data extraction—Part II Delta Handling, https://sapbazar.com/articles/item/2048-cds-based-data-extraction-part-ii-delta-handling, Dec. 15, 2019, 16 pages.
CDS based data extraction—Part 1 Overview, http://www.sapspot.com/cds-based-data-extraction-part-i-overview/, Jan. 26, 2020, 11 pages.
Singh, S4HANA: Attachment Services Ways of consumption—DMS and GOS, https://blogs.sap.com/2016/03/11/s4hana-attachment-services-ways-of-consumption-dms-and-gos/, Mar. 11, 2016, 8 pages.
Setting up SAP S/4HANA attachment services (front-end system), https://help.sap.com/viewer/S4HANA_1610_AdminGuide/bbe57fc26cd24a9287d0333a2df13cad.html, at least as early as Feb. 21, 2020, 2 pages.
Singh, S4HANA: Attachment Services—BAdI Extensions, https://blogs.sap.com/2016/03/12/s4hana-attachment-services-badi-extensions/, Mar. 12, 2016, 5 pages.
Attachment Service to your rescue in S4HANA via Fiori Elements using Reuse Components (GOS), http://www.sapspot.com/attachment-service-to-your-rescue-in-s4hana-via-fiori-elements-using-reuse-components-gos/, Dec. 23, 2019, 8 pages.
What is Document Service, https://help.sap.com/viewer/b0cc1109d03c4dc299c215871eed8c42/Cloud/en-US, at least as early as Feb. 21, 2020, 7 pages.
Tulsi, Intelligent ERP Update: Sap S/4HANA Cloud 1905 Release—Deep Dive for Analytics, https://blogs.sap.com/2019/05/15/intelligent-erp-update-sap-s4hana-cloud-1905-release-deep-dive-for-analytics/, May 15, 2019, 8 pages.
SLT (SAP Landscape Transformation Replication Server) in SAP HANA, https://www.guru99.com/slt-sap-landscape-transformation-replication-server-in-sap-hana.html, at least as early as Feb. 21, 2020, 13 pages.
Monitoring Delta Queues, https://help.sap.com/saphelp_snc70/helpdata/EN/7b/5bce89037f4897a69b02ecda028517/content.htm?no_cache-true, at least as early as Feb. 21, 2020, 2 pages.
Replicating data from SAP Applications to BigQuery through SAP Data Services and SAP LT Replication Server, https://cloud.google.com/solutions/sap/docs/bigquery-replication-from-sap-apps, at least as early as Feb. 21, 2020, 26 pages.
Introduction to Operational Delta Queues, https://wiki.scn.sap.com/wiki/display/BI/Introduction+to+Operational+Delta+Queues, Mar. 24, 2017, 5 pages.
HANA Cloud Integration (HCI)-Data Services and ODP Extractors, https://learntips.net/hci-data-services-and-odp-extractors/, at least as early as Nov. 19, 2020, 7 pages.
Generic Delta for Sap Hana DataSources, https://help.sap.com/viewer/dd104a87ab9249968e6279e61378ff66/11.0/en-US/1f36dde4acd747139654f3f0dec5387e.html, at least as early as Feb. 21, 2020, 3 pages.
Model Parameters and Hyperparameters in Machine Learning—What is the difference? https://towardsdatascience.com/model-parameters-and-hyperparameters-in-machine-learning-what-is-the-difference-702d30970f6, Oct. 20, 2019, 7 pages.
Gradient descent, Wikipedia, https://en.wikipedia.org/wiki/Gradient_descent, at least as early as Apr. 1, 2020, 6 pages.
Cullen, PAi Series Blog 3: Training and Activating the out of the box predictive content shipped by S/4HANA, https://blogs.sap.com/2019/02/07/pai-series-blog-3-training-and-activating-the-out-of-the-box-predictive-content-shipped-by-s4hana/, Feb. 7, 2019, 25 pages.

\* cited by examiner

400

424 — @AbapCatalog.sqlViewName: 'IFLIGHT'
@Analytics.dataCategory: #FACT
@Analytics.dataExtraction : {
    enabled : true,
434 — delta.byElement : {
        name : 'FlightData',
        maxDelayInSeconds : 300 } }

404

428

442

438

446

412 — @VDM.viewType: #BASIC
@EndUserText.label: 'Flight'
408 — Define view I_Flight as select from sflight
       association [0..1] to I_airline as _Airline on
       $projection.Airline

416

{
    @ObjectModel.foreignKeyassociation: '_Airline'
    @EndUserText/label: 'Airline'
    key carrid as Airline,
    @EndUserText.label: 'Flight Connection'
    key connid as FlightConnection,
    @EndUserText.label: 'Flight Date'
    @Semantics.businessDate.lastChangedAt
    key fldate as FlightDate,
    @EndUserText.label: 'Flight Price'
    @Semantics.amount.currencyCode: 'Currency'
    price    as FlightPrice,
    _Airline
}

@AbapCatalog.sqlViewName: 'ZSALDOCHDEX'
@AbapCatalog.compiler.compareFilter: true
@AbapCatalog.preserveKey: true
@AccessControl.authorizationCheck: #CHECK
@EndUserText.label: 'CDC Delta – Projection with Automatic'

@Analytics: {
  dataCategory: #FACT,
  dataExtraction: {
    enabled: true,
    delta.changeDataCapture: {
      automatic: true } ⟵454
  }
} ⎫
  ⎬ ⟵428
  ⎭ define view ZC_SalesDocumentHeader_DEX
  as select from vbak
{
  key vbeln as SalesDocument,
  @Consumption.filter.mandatory
  vbtyp as SDDocumentCategory,
  @Consumption.hidden
  vkorg as SalesOrganization,
  spart as Division,
  kunnr as SoldTo
}

FIG. 4B

FACILITATING MACHINE LEARNING USING REMOTE DATA

FIELD

The present disclosure generally relates to sharing data. Particular implementations facilitate sharing data between computing systems, such as for analyzing on a second computing system data stored on a first computing system.

BACKGROUND

In many situations it may be desirable to share data between computing systems. In some cases, having data on multiple systems can increase data availability and can spread a computing workload over multiple computing devices. Data may be created or stored on a first computing system, but particular uses of the data may only be possible on, or at least better suited to, a second computing system.

As an example, machine learning is becoming an important tool for analyzing data, including for decision making purposes or to provide new insights. In some cases, software applications or suites, including the S/4 HANA software of SAP SE, of Walldorf Germany, provide for some machine learning techniques to be used for data acquired as part of operating an enterprise resource planning (ERP) system.

Having machine learning functionality locally available as part of an ERP solution can be very helpful for an enterprise. However, there can be scenarios where it can be useful to conduct machine learning analyses on another system, such as cloud computing system. Issues can arise in transferring data from a local system to a cloud computing system. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for facilitating the use of machine learning techniques. In some cases, a system suitable for providing a machine learning analysis can be different from a remote computer system on which training data for a machine learning model is located. A machine learning task can be defined that incudes an identifier for at least one data source on the remote computer system. Data for the at least one data source is received from the remote computer system. At least a portion of the data is processed using a machine learning algorithm to provide a trained model, which can be stored for later use. Data on the remote computing system can be unstructured or structured. Particularly in the case of structured data, a remote computer system can make updated data available to the machine learning task.

In one aspect, a method is provided for training a machine learning model using data obtained from a remote computing system. A machine learning task is defined. The machine learning task incudes training data located on a remote computer system. An identifier for at least one data source on a first remote computer system is included in the definition of the machine learning task. Data for the at least one data source is received from the first remote computer system. At least a portion of the data is processed to provide a machine learning model. The machine learning model is stored.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIGS. 4A and 4B are example view definitions for a virtual data model, providing annotations useable to extract data to be made available to a cloud system.

DETAILED DESCRIPTION

Example 1—Overview

Figure 1:
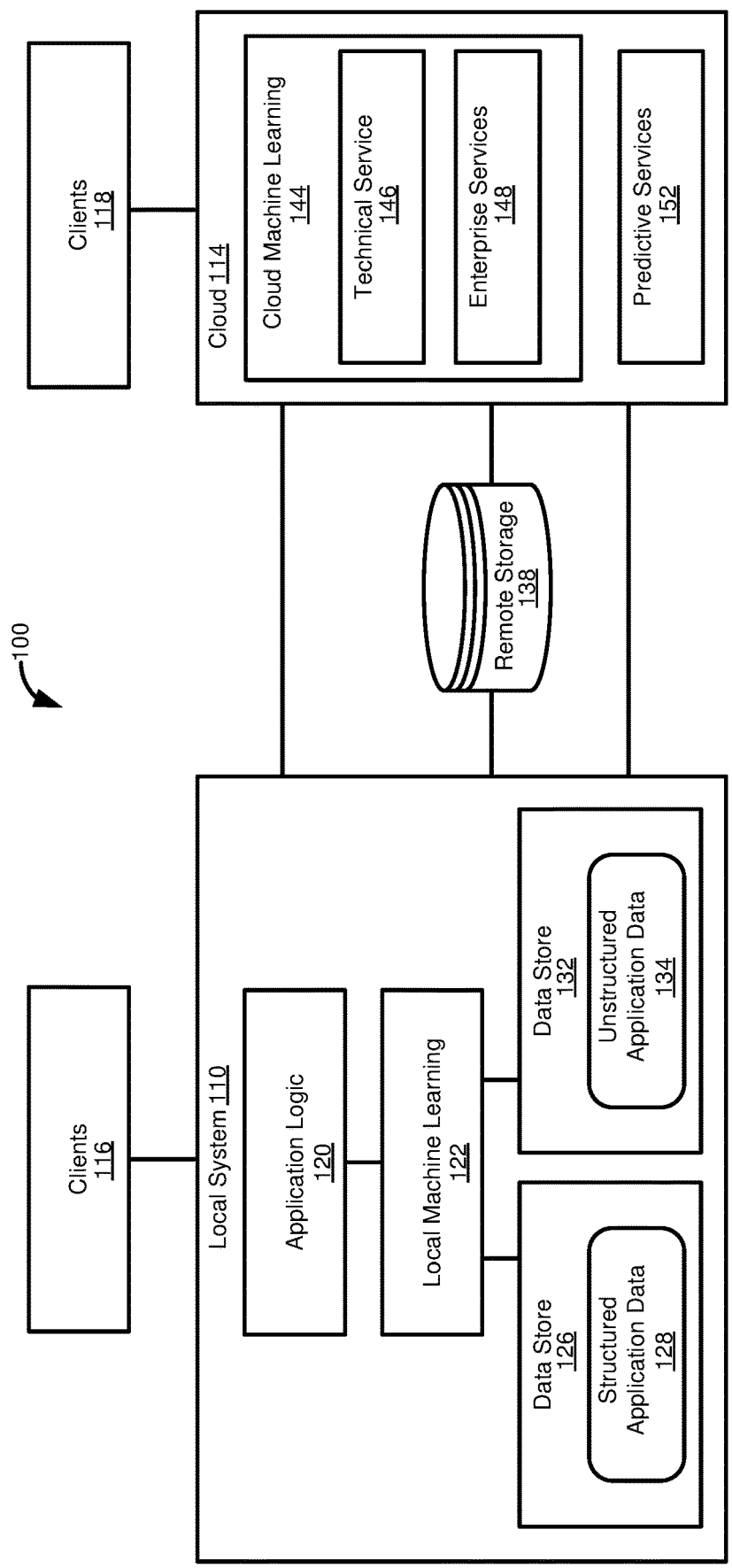
FIG. 1 is a diagram of a system architecture having a local system and a cloud system, where each system can provide machine learning functionality.

In many situations it may be desirable to share data between computing systems. In some cases, having data on multiple systems can increase data availability and can spread a computing workload over multiple computing devices. Data may be created or stored on a first computing system, but particular uses of the data may only be possible on, or at least better suited to, a second computing system.

As an example, machine learning is becoming an important tool for analyzing data, including for decision making purposes or to provide new insights. In some cases, software applications or suites, including the S/4 HANA software of SAP SE, of Walldorf Germany, provide for some machine learning techniques to be used for data acquired as part of operating an enterprise resource planning (ERP) system.

Having machine learning functionality locally available as part of an ERP solution can be very helpful for an enterprise. However, there can be scenarios where it can be useful to conduct machine learning analyses on another system, such as cloud computing system. A local computing system may have access to some machine learning features, for example, but other machine learning features, such as more complex machine learning models, may not be available in a local application component. In addition, a local computing system may have more limited computing resources (e.g., CPU processors) compared with a cloud computing environment. Even as to processes that are capable of being performed locally, it may be undesirable to do so in order to avoid potentially negative impacts on other, potentially more important, processes carried out by a local computing system.

Issues can arise in transferring data from a local system to a cloud computing system. One issue that can arise in transferring data between systems is identifying the data to be transferred. Typically, such data needs to be manually identified and processes manually configured for transferring the data. However, these processes can be complex and time consuming Individuals who understand what data is needed, such as for a particular machine learning analysis, may not have the technical skill to implement a data transfer. This situation can be exacerbated in that tools at the level of an end user application may not exist, requiring the use of lower-level tools, such as at a database layer. Users with the requisite technical knowledge may be able to transfer data between computing systems, but may not understand what data is needed for a particular purpose.

Thus, prior systems can require the involvement of multiple individuals, with different skill sets, in order to transfer data between computing systems. This requirement can increase the time, cost, and complexity of implementing machine learning solutions. Moreover, faced with these hurdles, many opportunities to analyze data using machine learning may be forgone altogether. Accordingly, room for improvement exists.

The present disclosure provides technologies that can be used to facilitate sharing selected data between computing systems, including in order to facilitate machine learning analyses. In particular the present disclosure provides techniques for transferring structured data (e.g., data that is ultimately maintained in physical database artefacts, such as tables or views), as well as techniques for transferring unstructured data (e.g., files, images, emails).

In the case of structured data, data to be transferred can be specified in a definition for a data artefact. A particular implementation provides for annotations for data transfer being provided in a definition of a virtual database artefact of a virtual data model, such as a Core Data Services View (CDS view) defined using the Core Data Services technology available in products of SAP SE, of Walldorf, Germany.

Annotations that define how structured data is to be transferred can include annotations indicating whether all or a portion of annotated data should be shared. For example, an annotation can indicate that a data integration framework should manage the annotated data. Another annotation can be used to indicate whether the annotated data should be monitored for changes (which can then be managed by the data integration framework), including what elements of the annotated data should be monitored or a particular change detection protocol that should be used.

In some cases, an annotated data artefact can include elements, such as particular attributes (e.g., corresponding to a particular column or field of a database table, or data from multiple such columns), that are monitored for changes, such as by evaluating a timestamp indicating when particular data (e.g., a particular value of the monitored attribute, such as a value in a particular record of a table) was added, deleted, or last modified. In other cases, an annotation can define that a trigger should be added to a database artefact (e.g., table or view), and when the trigger fires a corresponding change can be added to a change queue.

In the case of unstructured data, disclosed technologies can use functionality provided by application programs, or plugins, modules, frameworks, or other programs or program components that function in association with a given application program. An integration instance can be an operator in a pipeline for a machine learning task.

An integration instance can be defined that specifies, for example, particular data sources (e.g., folders, repository locations) that contain data that should be copied to another computing system, and optionally filter or selection criteria that should be applied (e.g., file names containing specific textual tokens, having specific file extensions, or being associated with particular metadata). Optionally, a schedule can be defined for when unstructured data should be updated, such as re-processing an entire specification of unstructured data (which can involve resending previously sent unstructured data), or scanning for new, deleted, or changed unstructured data.

An integration scenario can be used to define various aspects of an integration job (such as for obtaining data for training a machine learning model), including specifying structured or unstructured data associated with the job. Data processing steps can also be specified, as can particular consumers of data retrieved by a job. In a particular example, the integration scenario is a machine learning scenario. A machine learning scenario can specify data to be retrieved, any data processing that should be applied to retrieved data, and one or more machine learning algorithms that should be used to process the data. A machine learning scenario can include other components, such as particular applications or user interfaces that should be used to provide or interpret results of the machine learning algorithm.

The disclosed technologies can provide various advantages. Using annotations for artifacts in a virtual data model can make it easier for users to specify data that should be available for particular uses, such as machine learning. In some cases, a machine learning task can take advantage of annotations that were provided to data artefacts. That is, for example, a user can define a machine learning task by specifying particular artefacts from which data is desired, but need not annotate the artefacts (provided the artefacts already included suitable annotations). Similarly, using services on a remote computer system to obtain unstructured data can facilitate transferring such data to the remote computer system for use in training a machine learning model.

Example 2—Example Architecture Providing for Machine Learning at Local and Cloud Systems FIG. 1 illustrates an architecture 100 in which disclosed technologies can be used. Generally, the architecture 100 includes a local system 110 and a cloud-based system 114, which can have respective clients 116, 118. The local system 110 can, at least in some scenarios, be considered a client of the cloud-based system 114, in that the local system can use functionality provided by the cloud-based system 114. The cloud-based system 114 can also be considered as a client of the local system 110 in some circumstances, as the cloud-based system may receive data from the local system, and may use functionality provided by the local system (particularly services that provide data to the cloud-based system).

It should be appreciated that various changes can be made to the architecture in implementing various disclosed technologies. For example, the local system 110 could also be a cloud-based system. Similarly, the cloud-based system 114 need not be cloud-based, and could simply be another computing system. Although the clients 116, 118 are shown as external to the local system 110 and the cloud system 114, respectively, the clients, or at least some client-related functionality, can be included in the local system or the cloud system. One or both of the local system 110 or the cloud system 114 can omit clients 116, 118.

The local system 110 can include application logic 120, which can be logic associated with one or more software applications. The application logic 120 can use the services of a local machine learning component 122.

The local machine learning component 122 can include one or more machine learning algorithms, and optionally one or more specific tasks or processes. For instance, the local machine learning component 122 can have functionality for conducting an association rule mining analysis, where the application logic 120 (including as directed by an end user) can call the associated function (e.g., algorithm) of the local machine learning component.

In carrying out the requested function, the local machine learning component 122 can retrieve structured application data 128 from a data store 126, such as a relational database management system. Alternatively, all or a portion of data to be used by the local machine learning component 122 can be provided to the local machine learning component 122 by the application logic 120, including after being retrieved by, or on behalf of, the application logic from the data store 126.

The local system 110 can also include a data store 132 that stores unstructured data 134, including data for files such as emails, documents, or images. Unstructured data 134 can be made available to the local machine learning component 122, such as directed by the application logic 120.

The application logic 120 can store, or cause to be stored, data in a remote storage repository 138. The remote storage repository 138 can be, for instance, a cloud-based storage system. In addition, or alternatively, the application logic 120 may access data stored in the remote storage repository 138. Similarly, although not shown, in at least some cases, the local machine learning component 122 may access data stored in the remote storage repository 138.

The local system 110 may access the cloud-based system 114 (in which case the local system may act as a client 118 of the cloud-based system). For example, one or more components of the cloud-based system 114 may be accessed by one or both of the application logic 120 or the local machine learning component 122. The cloud-based system 114 can include a cloud machine learning component 144. The cloud machine learning component 144 can provide various services, such as technical services 146 or enterprise services 148. Technical services 146 can be data analysis that is not tied to a particular enterprise use case. Technical services 146 can include functionality for document feature extraction, image classification, image feature extraction, time series forecasts, or topic detection. Enterprise services 148 can include machine learning functionality that is tailored for a specific enterprise use case, such as classifying service tickets and making recommendations regarding service tickets.

The cloud system 114 can include predictive services 152. Although not shown as such, in at least some cases the predictive services 152 can be part of the cloud machine learning component 144. Predictive services 152 can include functionality for clustering, forecasting, making recommendations, detecting outliers, or conducting "what if" analyses.

Figure 2:
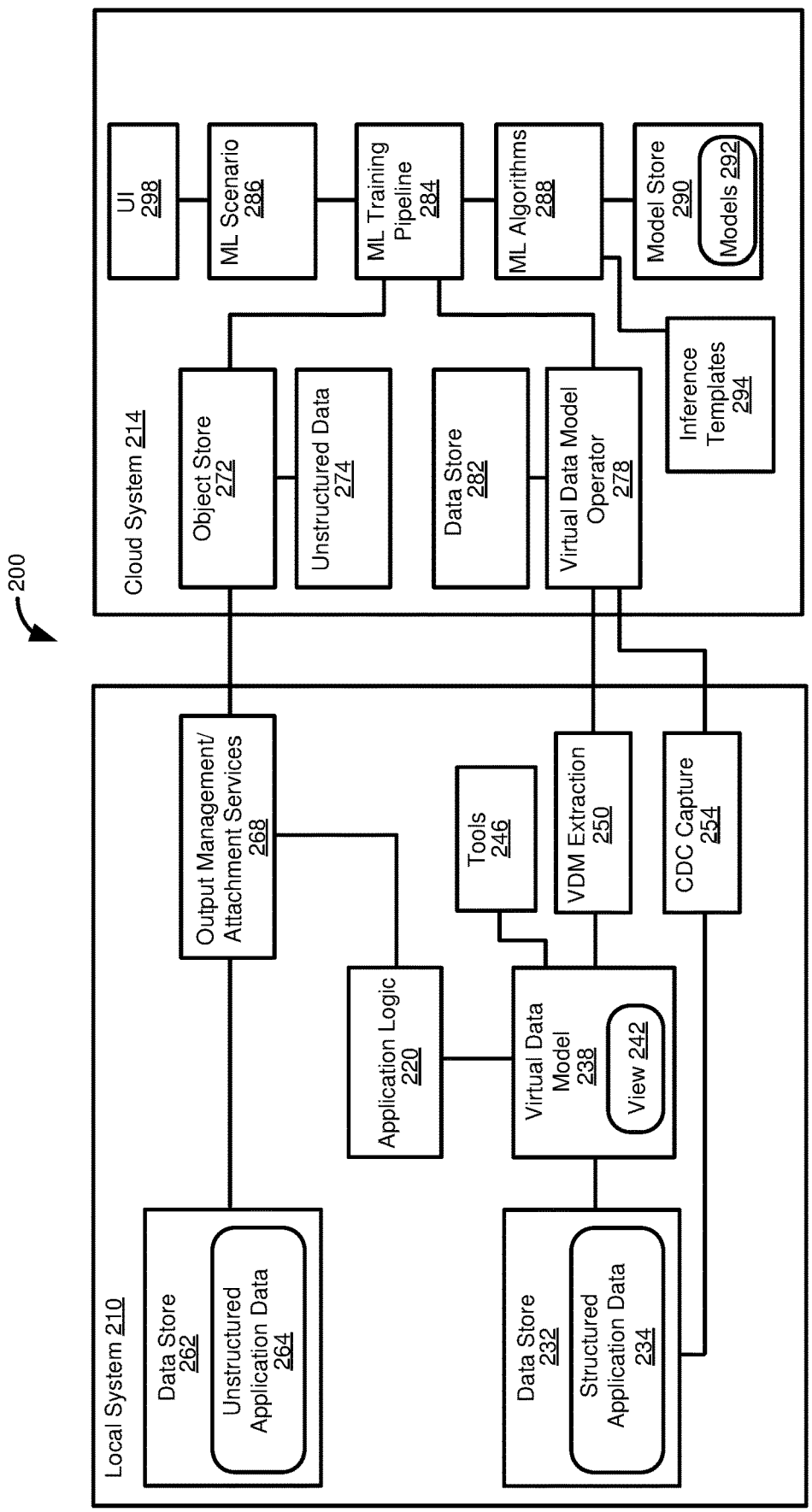
FIG. 2 is a diagram of a system architecture having a local system and a cloud system, and illustrating components that can be used to transfer data between such systems, including for machine learning analyses performed at the cloud system.

Example 3—Example Architecture with Components for Transferring Structured or Unstructured Data to a Cloud System FIG. 2 illustrates components of a computing environment 200 that can be used in disclosed technologies. The computing environment 200 includes a local system 210 and a cloud computing system 214, which can be analogous to the local system 110 and the cloud system 114 of FIG. 1. As discussed with respect to FIG. 1, the local system 210 and the cloud computing system 214 can more generally be a first computing system and a second computing system, without a requirement of any computing system being "local" or "cloud."

The local system 210 includes application logic 220, which can be analogous to the application logic 120 of FIG. 1. In particular, the application logic 220 can initiate, or be part of, a request to transfer data from the local system 210 to the cloud computing system 214. However, in some cases the application logic 220 need not participate in a process that sends data from the local system 210 to the cloud computing system 214. The cloud computing system 214 can include application logic analogous to the application logic 220, or can otherwise specify data to be retrieved from the local system 210.

The application logic 220 can access various types of data. The application logic 220 can access structured data 234 in a data store 232, which can be analogous to the structured data 128 and the data store 126 of FIG. 1.

The application logic 220 can interact with the structured data using a virtual data model 238. The virtual data model 238 can be similar to a data model, or data schema, used with structured data 234 in the data store 232. However, a virtual data model 238 typically includes semantic information that is not included in a data model used with the data store 232 (e.g., data typically included in a data dictionary or an information schema).

That is, a database typically includes a physical data model that defines how database data is to be stored. A physical data model can include features such as definitions for tables or views, such as defining attributes that are included in a table, their data types, and relationships to other database artefacts. A physical data model is directly used by a database system to store and retrieve information, and is typically manipulated using a query language, such as the structured query language (SQL).

A virtual data model 238, such as CDS entities (views or tables) in software available from SAP SE, of Walldorf, Germany, can include information useable to implement a database artefact in a database system, including creating a corresponding artefact in a physical data model and an instance of the artefact (e.g., a definition of a table can be added to an information schema, a table can be instantiated using that definition). When an artefact in the virtual data model 238 is activated, a corresponding entity can be created in the physical data model.

A virtual data model 238 can typically be enriched with information, such as defining associations to other artefacts of the virtual data model using path expressions rather than JOIN operations. This information can make it easier, particularly for less technical users, to understand an artefact and its relationships with other artefacts. An artefact in a virtual data model 238 can also include more complex fields, including custom defined data types, and can include expressions for calculating values from data retrieved from underlying entities in the physical data model. A virtual data model 238 can also annotate artefacts with information for specific semantic contexts, such as for providing access control, implementing data privacy measures, or providing information that can be used in rendering data in a user interface, among others.

One particular type of artefact in the virtual data model 238 is a view 242. A view 242 is typically defined with respect to one or more artefacts corresponding to tables. That is, a CDS artefact that corresponds to a table in the physical data model of the data store 232 can be created (and can be used to create a corresponding view in the data store 232). A view 242 can then be defined that refers to one or more CDS table artefacts, which in turn reference tables in a physical data model (implemented in the data store 232). As will be described in further detail, the views 242 can include annotations that facilitate the transfer of data to the cloud system 214. These annotations can be added using tools 246, which can provide a development environment for creating and editing the virtual data model 238, generally.

Annotations to artefacts in the virtual data model 238 can be read by a virtual data model extraction service 250 in order to read data from the virtual data model (and corresponding artefacts of the data store 232). The virtual data model extraction service 250 can initially read all data associated with an artefact of the virtual data model 238. Thereafter, if enabled and requested, the virtual data model extraction service 250 can read changes to data associated with the artefact of the virtual data model 238, such as added or changed data.

In some cases, changes to data associated with an artefact of the virtual data model 238 may not be detectable using the virtual data model extraction service 250. In this case, changed data can be detected, and sent to the cloud system 214, using a change data capture service 254. As will be further explained, the change data capture service 254 can place triggers on artefacts of the structured application data 234. When a trigger fires, the changes can be captured by the change data capture service 254 and made available to the cloud computing system 214. In a particular example, the change data capture service 254 can be a component of the S/4 HANA software available from SAP SE, of Walldorf, Germany.

The local system 210 can also have unstructured application data 264 in a data store 262 (which can be a file system, for example). The data store 262 and unstructured application data 264 can correspond to the data store 132 and unstructured application data 134 of FIG. 1. Although not shown, architecture 200 can include remote storage, corresponding to remote storage 138 of FIG. 1, which can hold unstructured application data. In this scenario, unstructured application data in remote storage can be processed analogously to the description provided for unstructured data 264 in the data store 262.

The data store 262 can communicate with one or more output management or attachment services 268. The output management or attachment services 268 can be configured to retrieve data specified by the application logic 220 (or a component of the cloud system) to be sent to the cloud system. In one example, the output management or attachment services 268 can use the Output Management functionality of S/4 HANA of SAP SE, of Walldorf, Germany. The Output Management functionality can be used to automate output of particular types of unstructured content, including documents or emails. Output Management functionality can be used to define both what unstructured data is output (e.g., particular types of unstructured data), receivers for unstructured data, and a format for the unstructured data (e.g., pdf document, image file, email file).

Output Management functionality can also include functionality for defining forms or templates, including forms or templates that can include data from structured data 234. For example, an email form can be configured to retrieve particular values of structured data 234 by referencing a view 242 (e.g., a CDS view). In this regard, it should be appreciated that unstructured application data 264 can be semi-structured data, including XML data or HTML data. In at least some embodiments, unstructured data 264 includes data other than data conforming to a structure found in relational database systems (e.g., data formatted in row or column format as part of a table). In addition, Output Management functionality can include functions for converting structured data or semi-structured data to an unstructured (or less structured) format, such as converting a form that contains data from structured data 234 to a pdf or image format.

SAP Attachment Service, available from SAP SE, of Walldorf, Germany, can be used in the output management or attachment services 268. SAP Attachment Service can be used to automatically upload attachments to the cloud system 214. The Attachment Service can be defined to upload attachments associated with logical data objects (e.g., a type of object in an object oriented programming approach, with a BusinessObject, as implemented in products of SAP SE, of Walldorf, Germany, being a specific example of a logical data object). In the case where a BusinessObject is a logical data object, the BusinessObject can be constructed with reference to one or more elements of the virtual data model 238 (e.g., CDS entities), including one or more views 242 (e.g., CDS views).

The cloud system 214 generally includes components to receive and process data received from the local system 210, including processing the data for a particular use scenario. The cloud system 214 can include an object store 272 for storing attachments or other unstructured data received from the output management or attachment services 268 of the local system 210. In a specific example, the object store 272 can be the Object Store of the SAP Cloud Platform available from SAP SE, of Walldorf, Germany. The Object Store can include functionality to store unstructured data (which can include semi-structured data) in particular storage spaces. Although shown as part of the cloud system 214, the object store 272 can be located on a different cloud computing system than the cloud system 214 that hosts other illustrated components. For example, the object store 272 can serve to manage unstructured data stored in an unstructured data store 274 (e.g., Amazon Web Services, a service provided by Amazon.com, Inc., of Seattle, Washington).

Other components can be used for storing unstructured data. For example, the object store 272 can include functionality provided by the Cloud Platform Document Service Center, available from SAP SE, of Walldorf, Germany. In some cases, the particular component of the object store 272 used in receiving data at the cloud system 214 can depend on a particular data provider of the local system 210. That is, for example, the Object Store of SAP SE, may be configured to receive data from the Output Management software of SAP SE, while the Cloud Platform Document Service may be configured to receive data from the Attachment Service of SAP SE.

Structured data 234 sent to the cloud computing system 214 from the virtual data model extraction component 250 or the change data capture component 254 can be processed by a virtual data model operator 278 of the cloud system. In some cases, the structured data provided to the virtual data model operator 278 can be in the form of logs. The virtual data model operator 278 can read the logs and appropriately format the data, such as storing the data in a table of a data store 282 (which can be, in some cases, the HANA database system of SAP SE, of Walldorf, Germany, included as provided in SAP's HANA Cloud Platform).

The virtual data model operator 278 can perform other functions. For example, the virtual data model operator 278 can format or supplement data according to an artefact of a virtual data model, including a view, which can correspond to the virtual data model 238 or the view 242 of the local system 210. In particular, definitions of components of the virtual data model 238 can be sent to the cloud system 214, including to be stored (not shown) by the cloud system 214 for use by the virtual data model operator 278.

Data from the object store 272 or the virtual data model operator 278 can be retrieved (or sent to) a machine learning training pipeline 284, in the case where data from the local system 210 is to be used in machine learning applications. The machine learning training pipeline 284 can include functionality for retrieving data, processing data for use by a machine learning algorithm, analyzing data using a machine learning algorithm, and visualizing or interpreting results.

The machine learning pipeline 284 can be defined, or at least used, by a machine learning scenario 286. A machine learning scenario 286 can include, or can cause the machine learning pipeline 284 to include, information necessary to perform a particular machine learning analysis using the cloud system 214. This information can include identifying unstructured application data 264 and/or structured application data 234 (typically by referencing appropriate artefacts of the virtual data model 238). The information can also include identifying a machine learning algorithm 288 of the cloud system 214 for the analysis, and can provide a location for a trained model 292 produced using the machine learning scenario 286 in a model store 290.

The machine learning scenario 286, in at least some cases, can also be called to execute an analysis for a particular set of input data using a trained model 292. Typically, the results of the analysis are processed using an inference template 294. An inference template 294 can analyze results provided by a trained model 292 in the context of a particular use case (e.g., a sales forecast or revenue analysis), and can include visualization or user interface elements to present data to a user and allow a user to interact with the results, such as through a user interface 298. In some cases, the user interface 298 can also allow a user to create, modify, or delete a machine learning pipeline 284, a machine learning scenario 286, a trained model 292, or an inference template 294.

Figure 3:
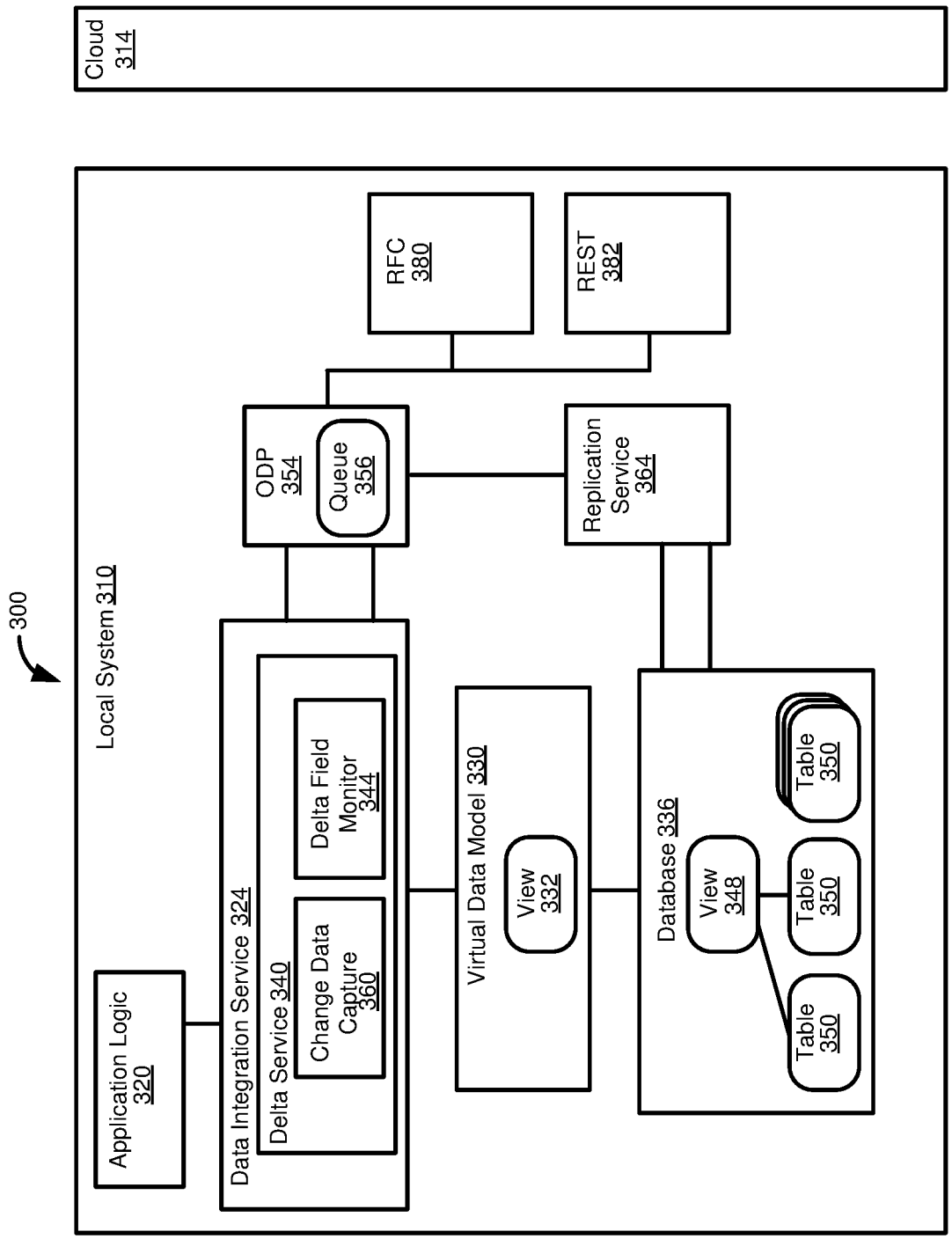
FIG. 3 is a diagram of a system architecture illustrating components of a local system that can be used to transfer structured data to a cloud system.

Example 4—Example Architecture with Components for Sending Changed Data to a Cloud System FIG. 3 illustrates a computing environment 300 that provides further details regarding how data can be sent from a local system 310 to a cloud system 314, which can be analogous to the local systems 110, 210 and the cloud systems 114, 214 of FIGS. 1 and 2. The local system 310 includes application logic 320, which can be analogous to the application logic 120 of FIG. 1 or the application logic 220 of FIG. 2.

The application logic 320 can be used to interact with a data integration service 324, and a virtual data model 330 (which can be analogous to the virtual data model 238 of FIG. 2). Application logic 320 can request a machine learning scenario be executed by the cloud system 314. As part of the request, the application logic 320, or another component of the local system 310 (e.g., tools, not shown, which can be analogous to the tools 246 of FIG. 2), can annotate appropriate artefacts (e.g., a view 332, which can be analogous to the view 242 of FIG. 2) to enable data extraction for data associated with the virtual data model artefact, such as by causing data to be sent from artefacts in a database 336 (which can represent at least a portion of the data store 232 for structured application data 234 of FIG. 2).

In some cases, when an artefact of the virtual data model 330 is annotated, a full copy of the indicated data can be transferred to the cloud system 314. In other cases, annotations can be added to artefacts of the virtual data model 330, but data transfer is not initiated until triggered by the application logic 320 or, in an alternative scenario, a component of the cloud system 314 (e.g., a component that corresponds to an element of the machine learning training pipeline 284 of FIG. 2, or another component or application that is to perform tasks using data retrieved from the local system 210). Selecting all data to be transferred can be implemented by, or using equivalent functionality to, selecting all data from the appropriate data sources (e.g., using a SQL SELECT*FROM . . . statement) and transferring the resulting data to the cloud system 314.

In some cases, a user or computer process may wish to update data in the cloud system 314 after an initial transfer of data from the local system 310. A request to send changed data to the cloud system 314 can be included in an annotation to an artefact of the virtual data model 330, in a particular implementation.

Changed data can be detected and sent to the cloud system 314 using a variety of techniques. The data integration service 324 can include a delta service 340. The delta service 340 can detect data changes and transfer changed data to the cloud system 314 in a number of ways, which can depend on the definition of a particular artefact of the virtual data model 330.

In some cases, changes to data can be determined using a delta field monitor 344. The delta field monitor 344 can monitor changes to timestamps associated with particular data elements (e.g., attributes of a view 348 or a table 350 of the database 336 that are referenced by an artefact of the virtual data model 330). If a change to data is detected, the relevant data can be added to a queue 356 of an operational data provider (ODP) component 354. The ODP component 354 can be the Operational Data Provisioning software available from SAP SE, of Walldorf, Germany. In some cases, the ODP 354 can send (e.g., push) data from the queue 356 to the cloud system 314. In other cases, the cloud system 314 can periodically check the queue 356 for relevant data and pull such data from the queue.

There can be artefacts in a virtual data model 330 for which attributes are not available for use in change detection by the delta field monitor 344. For example, while the database system 336 may log changes to data (e.g., record a timestamp for when a record was added, updated, or deleted), this information may not be exposed to an artefact of the virtual data model 330 that references data in the database system 336. In this case, changes can be propagated to the cloud system 314 using a change data capture component 360 of the data integration service 324.

The change data capture component 360 can apply triggers to relevant artefacts of the database 336 (e.g. views 348 or tables 350). For example, the change data capture component 360 can read annotations of artefacts of the virtual data model 330 and generate suitable triggers in the database 336, such as using appropriate SQL statements to create the triggers. When a trigger fires in response to a change to data on a corresponding artefact of the database 336, the changed data can be provided to the ODP 354, which can add the changed data to the queue 356.

In some implementations, applying triggers or receiving changed data can be facilitated by additional components. In particular, the local system 310 can include a replication service 364. The replication service 364 can apply triggers to artefacts in the database 336 and receive data changes when a trigger fires. The changed data can be provided by the replication service 364 to the ODP 354. In a particular implementation, the replication service 364 can be the SAP Landscape Transformation Replication Server, available from SAP SE, of Walldorf, Germany.

In some cases, complications can arise using change data capture techniques. For example, it is possible that a view 332 of the virtual data model 330 may not expose all key fields of underlying artefact(s) of the database 336. In this case, it may not be possible to determined changed records from changed table entries (e.g., because insufficient information exists to determine the primary key values of the records corresponding to the changes). Similarly, views that include fields from associations with 1:N cardinality (and, relatedly, filtering, such as using a SQL WHERE clause, on a joined view using non-key fields), which contain aggregation or unions, or which include parameters can complicate determining records associated with changed data.

In the event an artefact of the virtual data model 330 is unsuitable for use with change data capture, various alternatives can be implemented. One alternative is to instead use timestamp based change detection, as described above, assuming a suitable field is available. Another alternative is to rewrite a more complex artefact, particularly a view, as smaller, less complex artefacts on which change data capture (or timestamp based detection) can be used. An application or end user can join or aggregate data based on these simpler artefacts.

As another alternative, artefacts of the virtual data model 330 for which change data capture is not available can be designated for full extraction only. If updates are desired, a transfer of all data corresponding to the artefact can be transferred. In a further implementation, artefacts in the virtual data model 330 can be implemented specifically for data integration/extraction, and can thus be written in a way to minimize or eliminate the above-identified issues, such as including all attributes from the underlying artefacts of the database 336 as a flat list in the artefact of the virtual data model.

Data can be retrieved by the cloud system 314 in various manners (and optionally sent to the cloud system by the local system 310). The local system 310 can provide various components for allowing the cloud system 314 to retrieve data (e.g., from the queue 356), including an RFC (remote function call) component 380 or a REST (representational state transfer) component 382.

Example 5—Example Virtual Data Model Artefacts with Extraction Annotations

FIG. 4A is an example definition 400 for an artefact of a virtual data model (e.g., the virtual data model 238 of FIG. 2 or the virtual data model 330 of FIG. 3) that illustrates how the definition can be annotated to facilitate data extraction, including for facilitating machine learning analyses conducted using a cloud system.

The view definition 400 can include a name 404 for the view that will be included in a data dictionary or schema repository, such as the virtual data model 238 of FIG. 2 or the virtual data model 330 of FIG. 3. A different name, provided by 408, can be shown to an end user. In some cases, views can have different types (e.g., basic, composite, consumption), which type can be specified by 412.

Data referenced by the view created using the definition 400 can be specified using SQL statement 416. When the view definition 400 is activated, a corresponding view can be created in a database based on the SQL statement. Typically, the database view lacks other components included in the definition 400, including annotations 420 that can be used to label information provided to a user in association with the view definition 400.

Additional annotations, and again typically not included in a corresponding database view, can include an analytic annotation 424 and data extraction annotations 428. The analytic annotation 424 can indicate a general type for data associated with the view definition, such as dimension (e.g., master data), fact (e.g., transaction data), cube, or projection.

The data extraction annotations 428 can include an annotation 434 indicating whether extraction has been enabled. The annotation 434 can be assigned, in a specific example, a Boolean value indicating whether data extraction has been enabled. The value of the annotation 434 can be used by a data extraction or integration service, such as the data integration service 324 of FIG. 3 (and components used therewith), to determine whether the view defined by the view definition 400 should be processed. If the annotation 434 is set to TRUE, in some cases, an initial extraction of all indicated data for the view definition 400 is processed by the data integration service.

An annotation 438 can be used to enable, and optionally set options, for sending data changes to a consumer (e.g., a cloud system). An annotation 442 specifies a particular element, or attribute, that should be analyzed to determine whether a data change has occurred. Typically, the element selected for annotation 442 is an element for which a date or timestamp is available to the view definition 400 (as opposed to being maintained in associated database artefacts but not made available to the view definition).

An annotation 446 can be used to specify a maximum delay period useable to determine whether changes to an element specified by the annotation 442 should be processed for sending to subscribers. For example, there can be a delay between the assigning of a timestamp or date and actual commit of the change. If the period specified by annotation 446 is exceeded, the change may be omitted from processing by a data extraction/integration service.

FIG. 4B provides another example view definition 450. The view definition is generally similar to the view definition 400. However, data extraction annotations 428 include an annotation 454 indicating that change data capture should be used, rather than the annotation 438 specifying that timestamp/data information of changes for a particular attribute should be used. Correspondingly, the extraction annotations 428 of the view definition 450 omit elements 442, 446.

Example 6—Example Architecture with Change Data Capture Components

Figure 5:
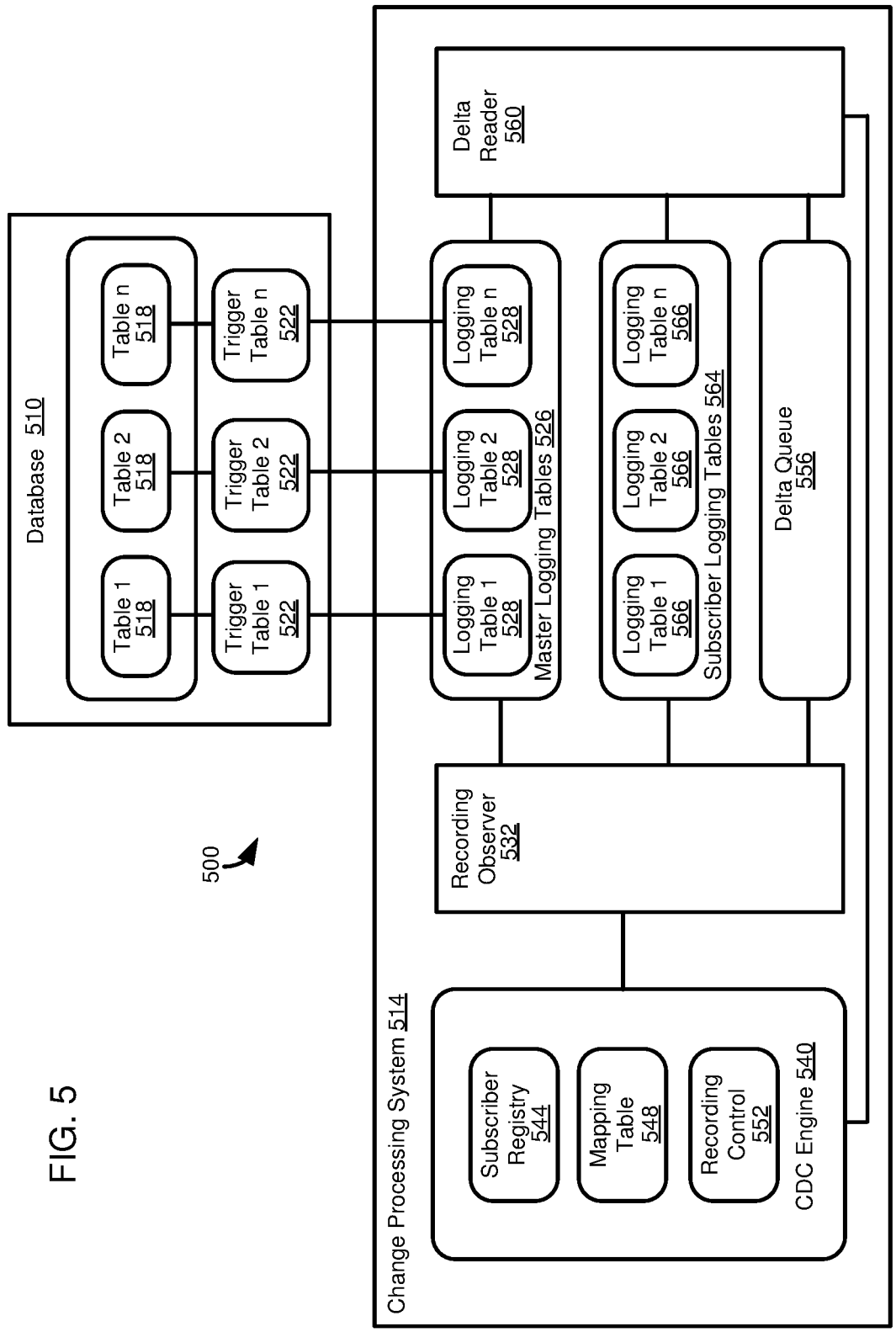
FIG. 5 is a diagram of a system architecture illustrating how changes to database artefacts detected using triggers can be made available to a cloud system.

FIG. 5 illustrates a computing architecture 500 that can be used to process information from a change data capture component, such as the change data capture component 360 of FIG. 3. The architecture 500 includes a database 510, which can be the database 336 of FIG. 3, and a change processing system 514, which can include functionality of one or more of the delta service 340 (including the change data capture component 360), the replication service 364, or the ODP 354.

The database 510 includes a plurality of tables, including a plurality of tables 518 that are associated with respective triggers 522 (which can be created based on annotations to an artefact of a virtual data model). When a change is detected by a trigger 522, the change can be recorded in a corresponding logging table 528 of a set 526 of master logging tables. Data in the logging tables 528 can be read by a recording observer 532. The recording observer 532 can insert into a queue 556 changes that are to be sent to one or more subscribers to changes to a given table 518.

A change detection engine 540 can include a subscriber registry 544 that provides information for various subscribers for changes processed by the change processing system 514, and can include specific computing systems (e.g., cloud computer systems) or components thereof, such as particular machine learning scenarios. A mapping table 548 can be used to map subscribes of the subscriber registry 544 to artefacts of a virtual data model, which in turn can be used to determine tables 518 from which a given subscriber should receive changes. Overall operations of at least certain aspects of the change processing system can be orchestrated by a recording control component 552.

Changes detected by the recording observer 532 that are associated with one or more subscribers can be placed in a delta queue 556. A delta reader 560 can read changes in the delta queue 556 and determine which changes should be made available to particular subscribers. In doing so, the delta reader 560 can access loggings tables 566 of a set 564 of subscriber logging tables. The logging tables 566 can be used to track what data has been sent to, or retrieved by, a given subscriber. Thus, the logging tables 566 can help the delta reader 560 ensure that a subscriber receives all relevant changes, without sending duplicate information. As jobs for particular subscribers are processed from the delta queue 556, they can be retrieved from the delta queue, and as a job is processed the corresponding logging table 566 can be updated. In some cases, when all subscribers have received changes from the master logging tables 526, the changed data can be removed from the appropriate logging tables 528. In some cases, the recording observer 532 can call the delta reader 560 when new changes are available in the logging tables 528.

Example 7—Example Machine Learning Pipeline

Figure 6:
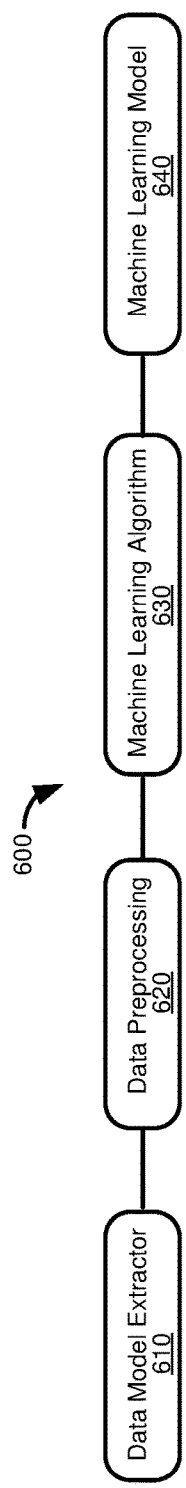
FIG. 6 is diagram representing a processing flow in a machine learning pipeline that can be used in disclosed technologies.

FIG. 6 illustrates an example of operators in a machine learning pipeline 600 for a machine learning scenario, which can correspond to elements 284, 286 of FIG. 2, respectively. The machine learning pipeline 600 includes a data model extractor operator 610. The data model extractor operator 610 can specify artefacts in a virtual data model from which data can be extracted. The data model extractor operator 610 typically will include path/location information useable to locate the relevant artefacts, such as an identifier for a system on which the virtual data model is located, an identifier for the virtual data model, and identifiers for the relevant artefacts.

The data model extractor operator 610 can also specify whether data updates are desired and, if so, what type of change data processing should be used, such as whether timestamp/date based change detection should be used (and a particular attribute to be monitored) or whether change data capture should be used, and how often updates are requested. The data model extractor operator 610 can specify additional parameters, such as a package size that should be used in transferring data to the cloud system (or, more generally, the system to which data is being transferred).

In other cases, the data model extractor operator 610 can specify unstructured data to be retrieved, including options similar to those used for structured data. For example, the data model extractor operator 610 can specify particular locations for unstructured data to be transferred, particular file types or metadata properties of unstructured data that is requested, a package size for transfer, and a schedule at which to receive updated data or to otherwise refresh the relevant data (e.g., transferring all of the requested data, rather than specifically identifying changed unstructured data).

Typically, the type of data model extractor operator 610 is selected based on the nature of a particular machine learning scenario, including the particular algorithm being used. In many cases, machine learning algorithms are configured to use either structured data or unstructured data, at least for a given scenario. However, a given machine learning extraction pipeline can include a data model extractor operator 610 that requests both structured and unstructured data, or can include multiple data model extractor operators (e.g., an operator for structured data and another operator for unstructured data).

The machine learning pipeline 600 can further include one or more data preprocessing operators 620. A data preprocessing operator 620 can be used to prepare data for use by a machine learning algorithm operator 630. The data preprocessing operator 620 can perform actions such as formatting data, labelling data, checking data integrity or suitability (e.g., a minimum number of data points), calculating additional values, or determining parameters to be used with the machine learning algorithm operator 630.

The machine learning algorithm operator 630 is a particular machine learning algorithm that is used to process data received and processed in the machine learning pipeline 600. The machine learning algorithm operator 630 can include configuration information for particular parameters to be used for a particular scenario of interest, and can include configuration information for particular output that is desired (including data visualization information or other information used to interpret machine learning results).

The machine learning pipeline 600 includes a machine learning model operator 640 that represents the machine learning model produced by training the machine learning algorithm associated with the machine learning algorithm operator 630. The machine learning model operator 640 represents the actual model that can be used to provide machine learning results.

Typically, once the machine learning pipeline 600 has been executed such that the operators 610, 620, 630 have completed, a user can call the machine learning model operator 640 to obtain results for a particular scenario (e.g., a set of input data). Unless it is desired to update or retrain the corresponding algorithm, it is not necessary to execute other operators in the machine learning pipeline 600, particularly operations associated with the data model extractor operator 610.

Figure 7:
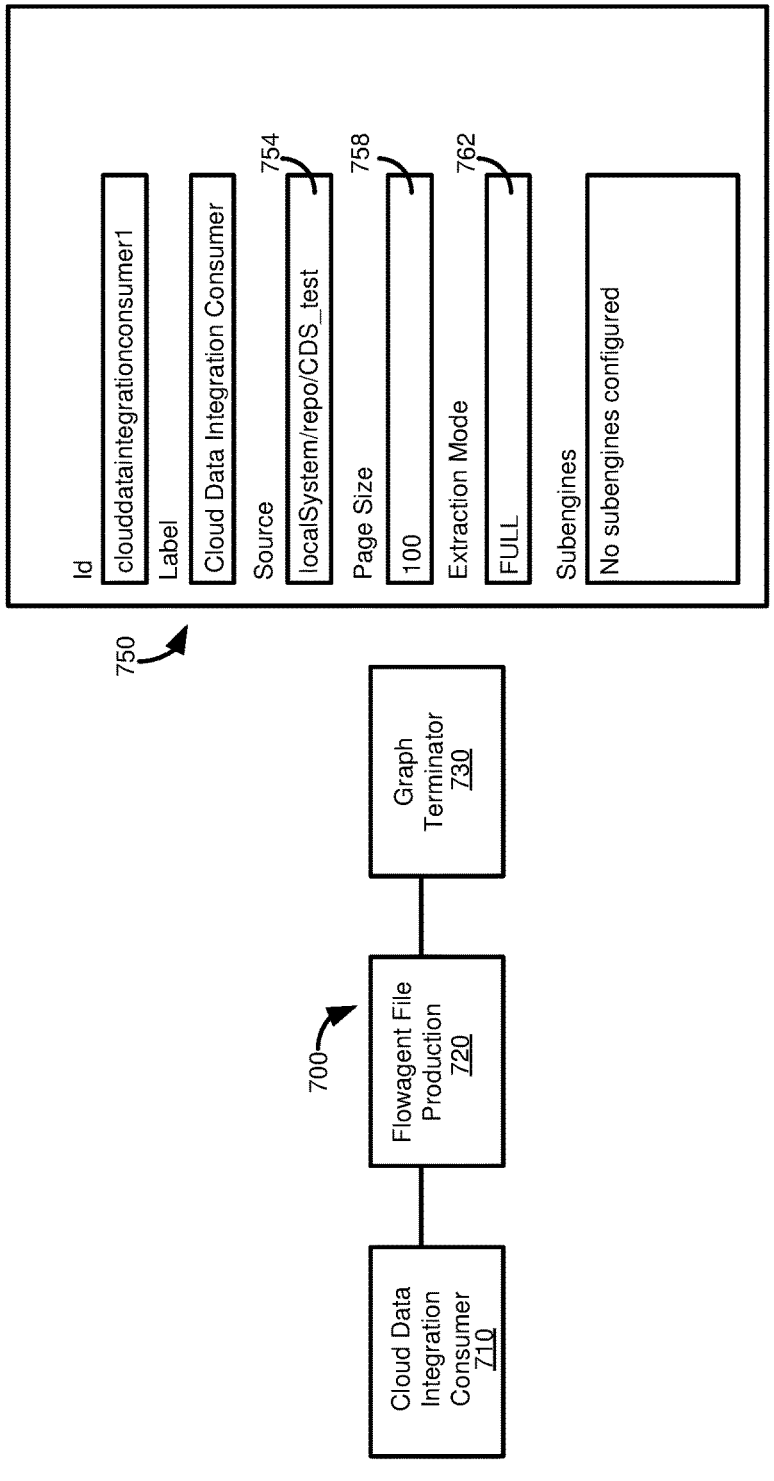
FIG. 7 is a diagram illustrating components of a machine learning pipeline, including subcomponents of the machine learning pipeline of FIG. 6, and a user interface component that can be used to view and configure parameters associated with operators in the machine learning pipeline.

FIG. 7 illustrates an example machine learning pipeline 700 that can represent an example of at least a portion of the machine learning pipeline 600 of FIG. 6. In particular, the machine learning pipeline 700 can represent actions associated with the data model extractor operator 610. In a particular example, the machine learning pipeline 700 can use operators associated with the SAP Data Hub, available from SAP SE, of Walldorf, Germany.

The machine learning pipeline 700 include a cloud data integration operator 710, which can be used to obtain structured or unstructured data as described in the present disclosure. Data received upon execution of the cloud data integration operator 710 can be stored as a file (or multiple files) using a flowagent file production operator 720. The machine learning pipeline 700 can terminate with a graph termination operator 730.

A user interface component 750 can be used to edit aspects of the machine learning pipeline 700 (which can also be displayed on a graphical user interface). As shown, the user interface component 750 includes a field 754 for specifying a particular data source, a field 758 for specifying a page size for data transfer, and a field 762 that can be used to specify an extraction mode (e.g., full, partial, whether updated data should be obtained).

Figure 8:
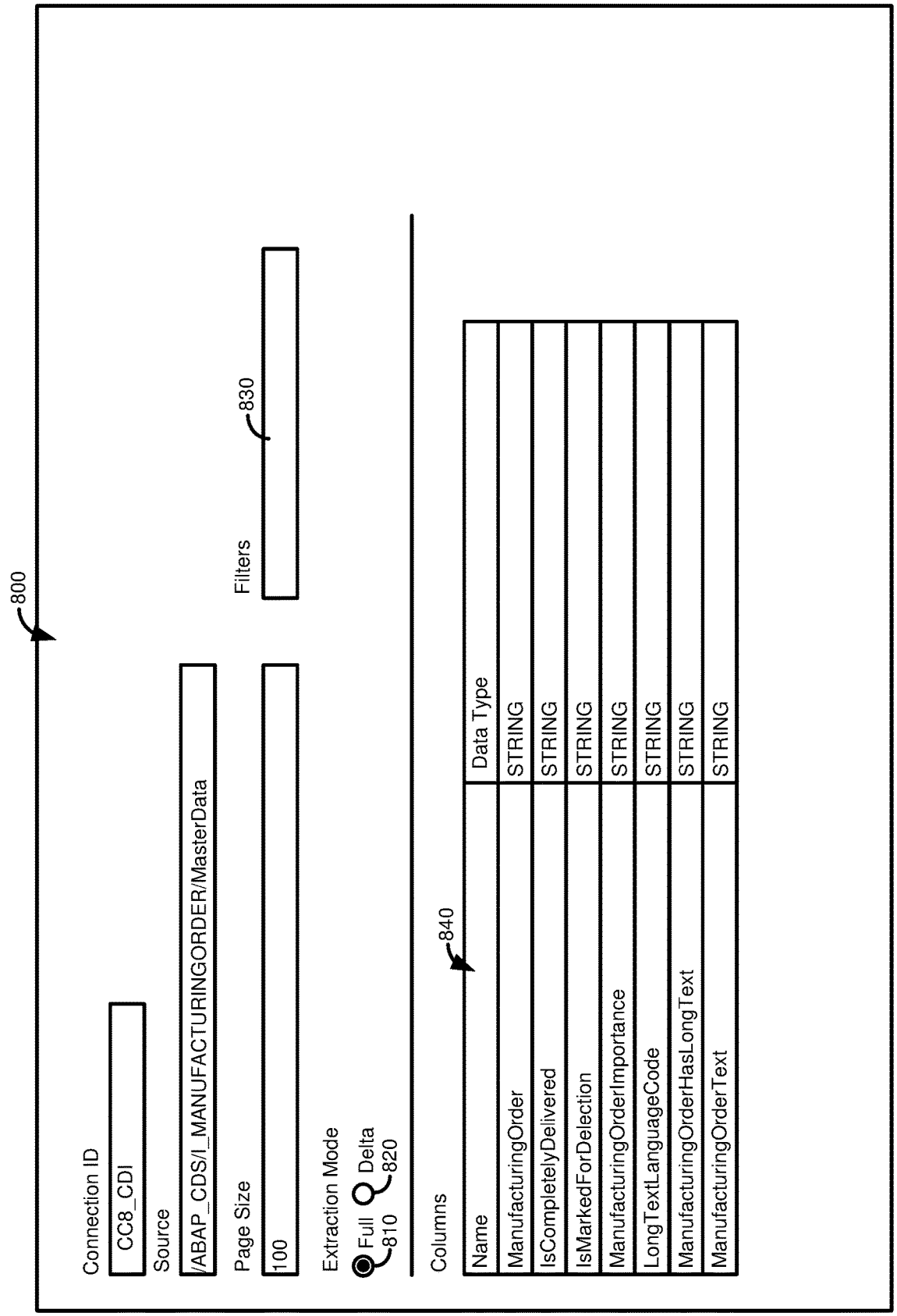
FIG. 8 is an example user interface screen that can be used to edit aspects of a machine learning pipeline, such as the pipelines of FIG. 6 or 7.

FIG. 8 presents a user interface screen 800 that can represent an alternative to the user interface component 750, or a screen that can be provided if a user selects to view more detailed information regarding the cloud data integration operator 710. The information provided in the screen 800 is generally similar to that shown in the user interface component 750. However, it can be seen that the screen 800 provides an option 810 to select full data transfer and an option 820 to retrieve only changed data. Additional filters (e.g., beyond any specified in an annotation to a source artefact of a virtual data model) can be specified in a field 830. The user interface screen 800 also lists attributes 840 that are available in the source artefact.

Example 8—Example Schema for Change Detection Processing

Figure 9:
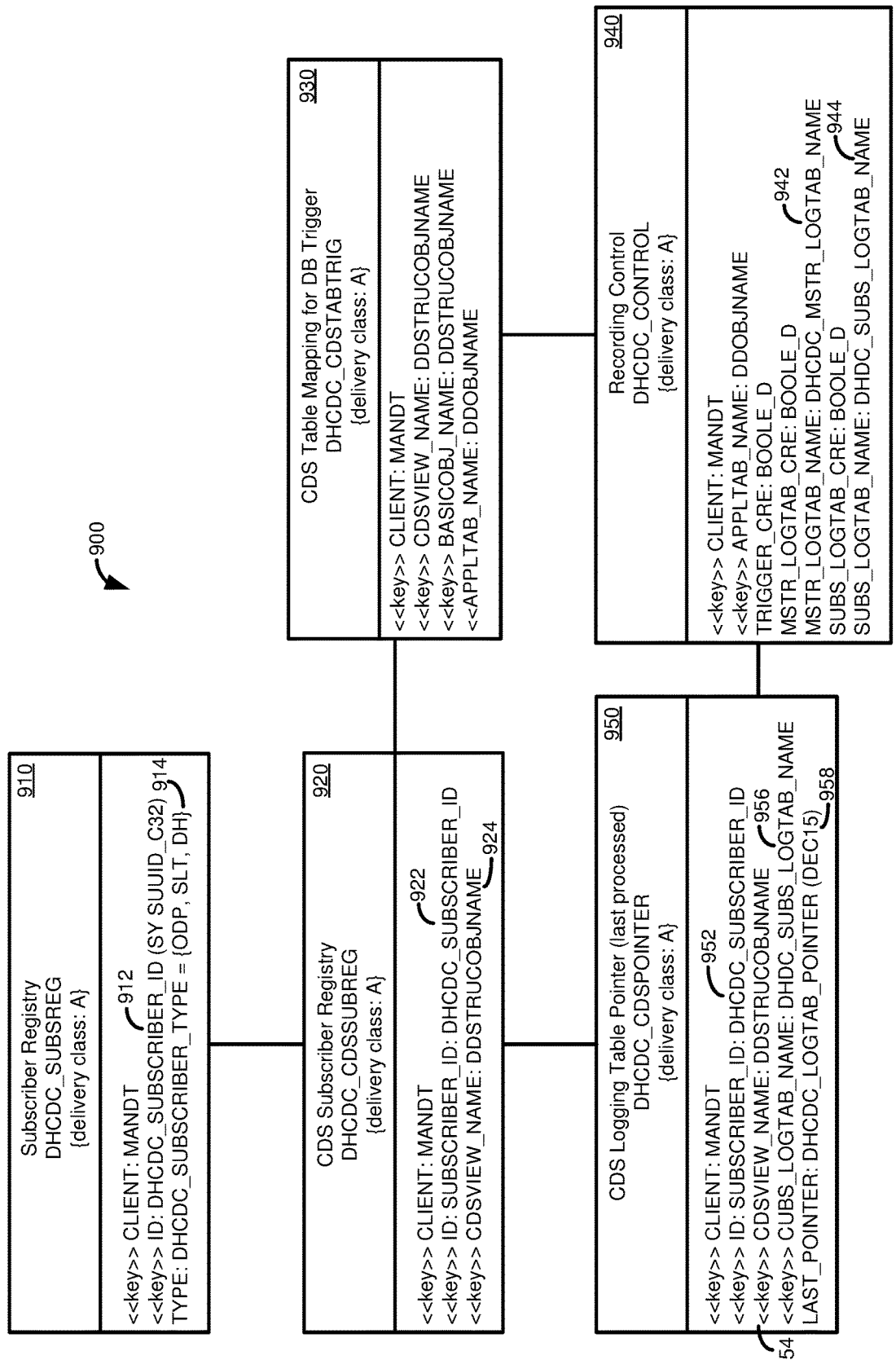
FIG. 9 is an example data model that can be used in managing structured data to be transferred to a cloud system.

FIG. 9 illustrates an example data model 900 that can be used in embodiments of disclosed technologies. In particular, the data model 900 can represent components of the architecture 500 of FIG. 5. A table 910 can correspond to a database artefact used to maintain the subscriber registry 544. The table 910 includes a field 912 for an identifier for the subscriber and a field 914 indicating a type for the subscriber, such as to which services (e.g., an ODP component, and SLT component, a delta handler) the identified subscriber is associated with.

A table 920 can correspond to the mapping table 548. The table 920 includes a field 922 for a particular subscriber (e.g., corresponding to the field 912) and a field 924 that indicates artefacts in a virtual data model that should be associated with the subscriber (e.g., the subscriber will receive all data from the associated data source or updates to data of such data source). A given subscriber can have multiple records in the table 920, with each record associating that subscriber with a different artefact of a virtual data model.

A table 930 can correspond to the subscriber logging tables 564 and a table 940 can correspond to a database artefact used as part of the recording control 552. The table 940 includes fields 942, 944 which can be used to associate a particular subscriber logging table 566 with a master logging table 528.

A table 950 can be used to track what changes have been read by a given subscriber. In some cases, the table 950 can be maintained by the delta reader 560. The table 950 has a field 952 for a subscriber identifier (e.g., the field 912), a field 954 identifying a particular artefact in a virtual data model, a field 956 linking a given record to a particular subscriber table (e.g., a table 930), and a field 958 that serves as a pointer to a last change read by the subscriber of the field 952.

Example 9—Example Machine Learning Scenario Definition

Figure 10:
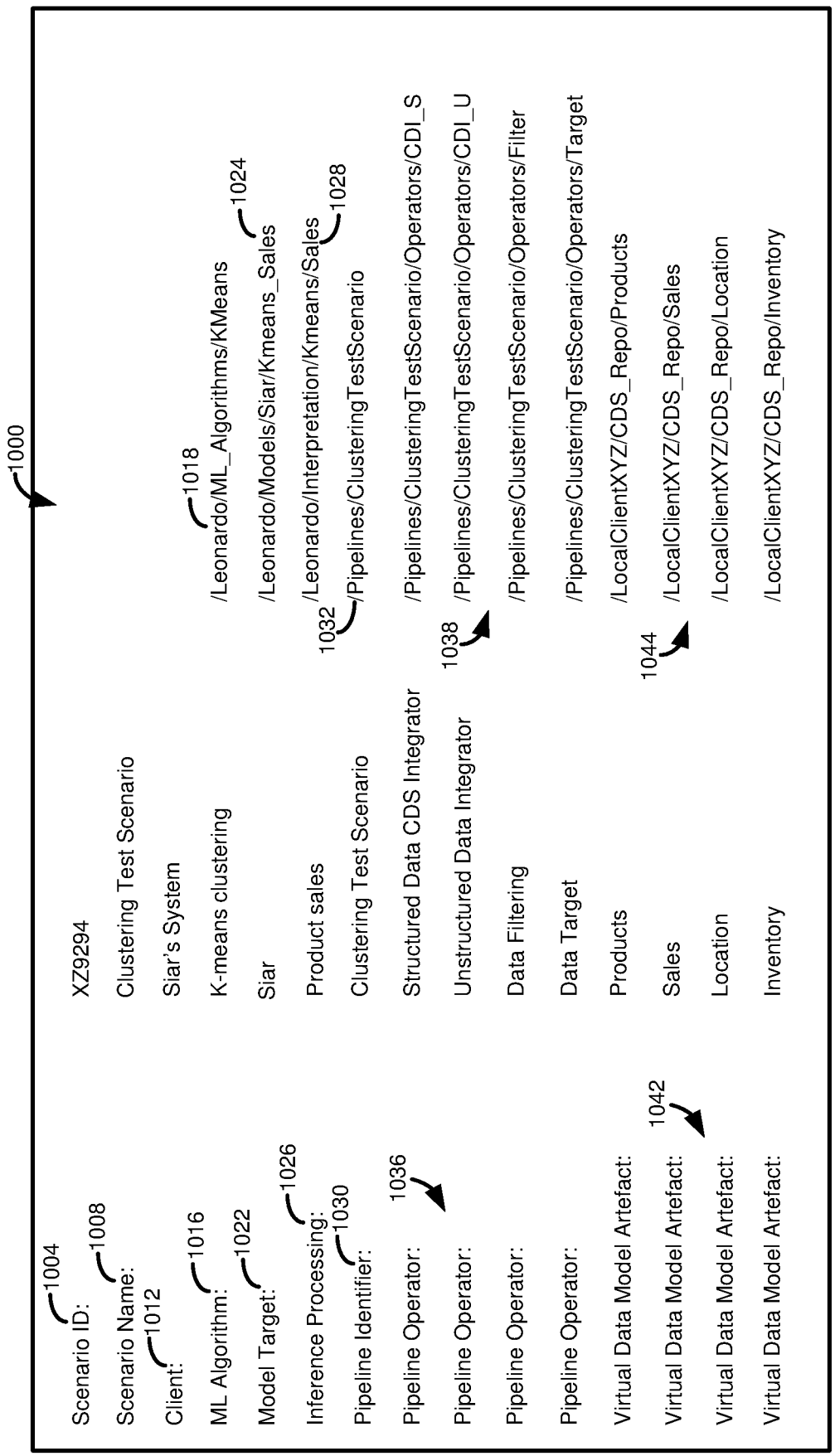
FIG. 10 is a table of metadata that can be used in an example machine learning scenario that can use disclosed technologies.

FIG. 10 illustrates example metadata 1000 that can be stored as part of a machine learning scenario, such as a machine learning scenario 286 of FIG. 2. Information in a machine learning scenario can be used to execute various aspects of the scenario, such as training a machine learning model or using the model to process a particular set of input.

The metadata 1000 can include a scenario ID 1004 useable to uniquely identify a scenario. A more semantically meaningful name 1008 can be associated with a given scenario ID 1004, although the name 1008 may not be constrained to be unique. In some cases, the scenario ID 1004 can be used as the identifier for a particular subscriber to structured or unstructured data. A particular client (e.g., system or end user) 1012 can be included in the metadata 1000.

An identifier 1016 can indicate a particular machine learning algorithm to be used for a given scenario, and can include a location 1018 for where the algorithm can be accessed. A target identifier 1022 can be used to indicate a location 1024 where a trained model should be stored. When the trained model is to be used, results are typically processed to provide particular information (including as part of a visualization) to an end user. Information useable to process results of using a machine learning algorithm for a particular set of input can be specified in a metadata element 1026, including a location 1028.

As discussed in prior Examples, a machine learning scenario can be associated with a particular machine learning pipeline, such as the machine learning pipeline 284 of FIG. 2. An identifier of the pipeline can be specified by a metadata element 1030, and a location for the pipeline (e.g., a definition of the pipeline) can be specified by a metadata element 1032. Optionally, particular operators in the given machine learning pipeline can be specified by metadata elements 1036, with locations of the operators provided by metadata elements 1038.

In a similar manner, the metadata 1000 can include elements 1042 that specify particular virtual data model artefacts that are included in the machine learning scenario, and elements 1044 that specify a location for the respective virtual data model artefact. In other cases, the metadata 1000 does not include the elements 1042, 1044, and virtual data model artefacts can be obtained using, for example, a definition for a pipeline operator. While not shown, the metadata 1000 could include information for unstructured data used by the machine learning scenario, or such information could be stored in a definition for a pipeline operator associated with unstructured data.

Figure 11:
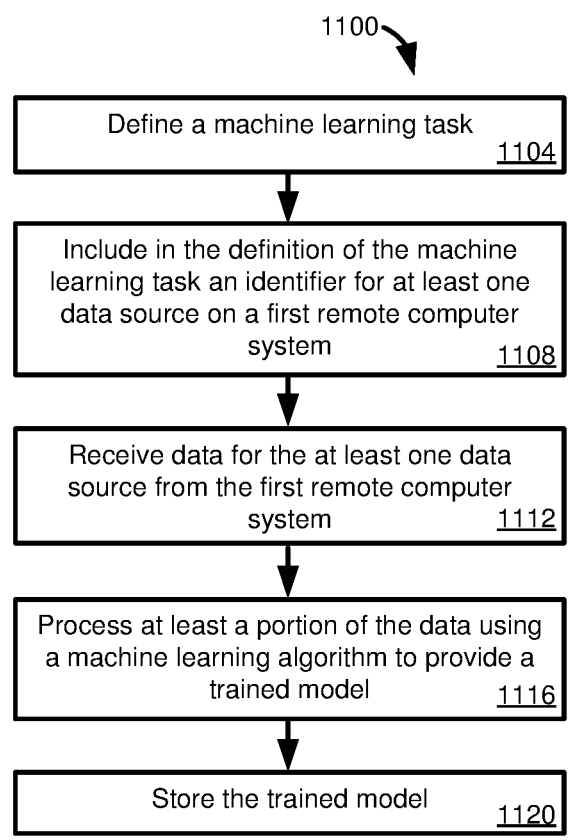
FIG. 11 is a flowchart illustrating operations in a method of retrieving data from a remote computing system to be used with a machine learning task, using disclosed technologies.

Example 10—Example Operations for Training a Machine Learning Model with Remote Data FIG. 11 illustrates a method 1100 for training a machine learning model using data obtained from a remote computing system. The method 1100 can be carried out, for example, using one or more of the architectures 200, 300, 500 of FIGS. 2, 3, and 5, and using technologies described in any of Examples 1-9.

At 1104, a machine learning task is defined. The machine learning task incudes training data located on a remote computer system. An identifier for at least one data source on a first remote computer system is included in the definition of the machine learning task at 1108. At 1112, data for the at least one data source is received from the first remote computer system. At least a portion of the data is processed at 1116 to provide a machine learning model. The machine learning model is stored at 1120.

Example 11—Computing Systems

Figure 12:
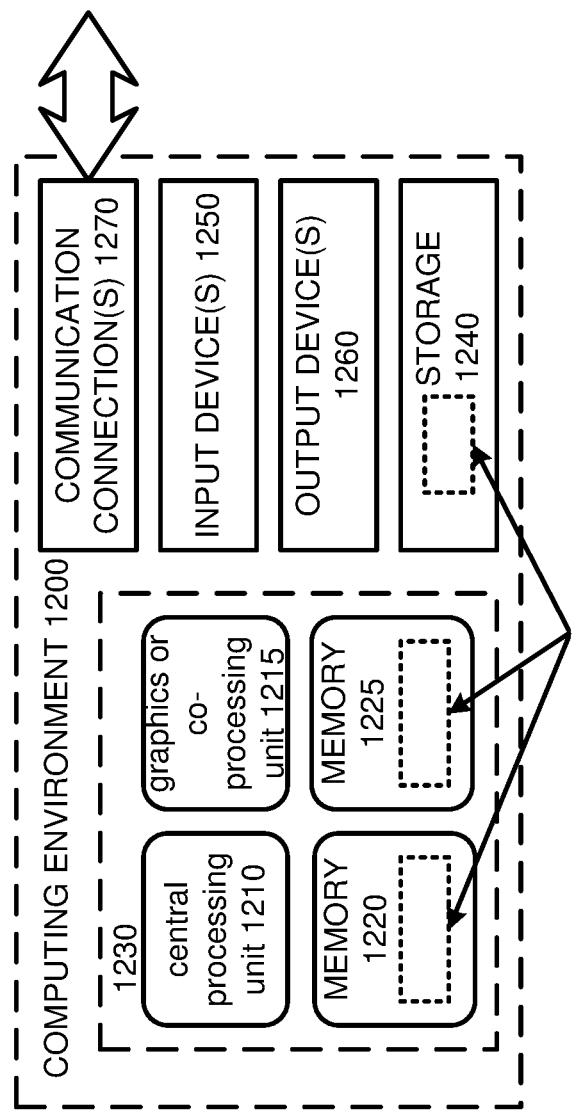
FIG. 12 is a diagram of an example computing system in which some described embodiments can be implemented.

FIG. 12 depicts a generalized example of a suitable computing system 1200 in which the described innovations may be implemented. The computing system 1200 is not intended to suggest any limitation as to scope of use or functionality of the present disclosure, as the innovations may be implemented in diverse general-purpose or special-purpose computing systems.

With reference to FIG. 12, the computing system 1200 includes one or more processing units 1210, 1215 and memory 1220, 1225. In FIG. 12, this basic configuration 1230 is included within a dashed line. The processing units 1210, 1215 execute computer-executable instructions, such as for implementing technologies described in any of Examples 1-10. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s) 1210, 1215. The memory 1220, 1225 stores software 1280 implementing one or more innovations described herein, in the form of computer-executable instructions suitable for execution by the processing unit(s) 1210, 1215.

A computing system 1200 may have additional features. For example, the computing system 1200 includes storage 1240, one or more input devices 1250, one or more output devices 1260, and one or more communication connections 1270. An interconnection mechanism (not shown) such as a bus, controller, or network interconnects the components of the computing system 1200. Typically, operating system software (not shown) provides an operating environment for other software executing in the computing system 1200, and coordinates activities of the components of the computing system 1200.

The tangible storage 1240 may be removable or non-removable, and includes magnetic disks, magnetic tapes or cassettes, CD-ROMs, DVDs, or any other medium which can be used to store information in a non-transitory way and which can be accessed within the computing system 1200. The storage 1240 stores instructions for the software 1280 implementing one or more innovations described herein.

The input device(s) 1250 may be a touch input device such as a keyboard, mouse, pen, or trackball, a voice input device, a scanning device, or another device that provides input to the computing system 1200. The output device(s) 1260 may be a display, printer, speaker, CD-writer, or another device that provides output from the computing system 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 12—Cloud Computing Environment

Figure 13:
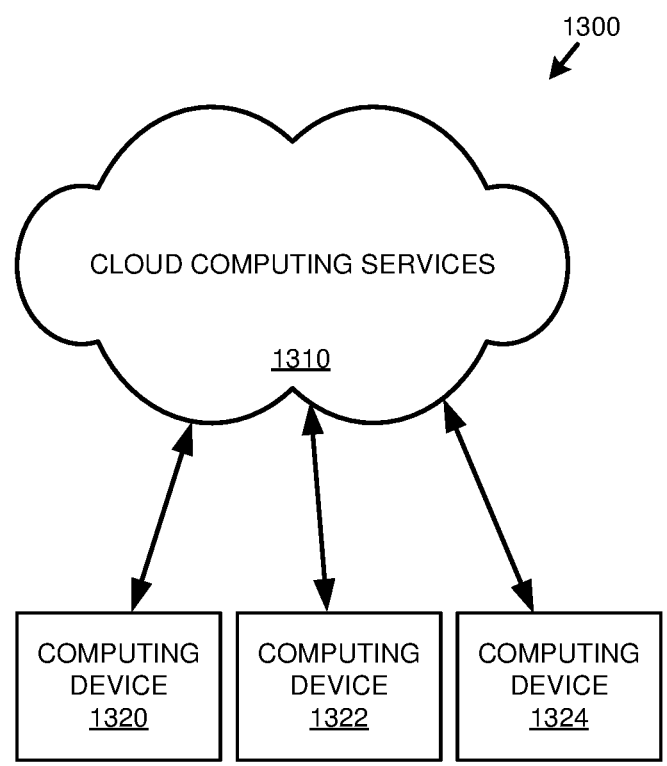
FIG. 13 is an example cloud computing environment that can be used in conjunction with the technologies described herein.

FIG. 13 depicts an example cloud computing environment 1300 in which the described technologies can be implemented, such as a cloud system 114, 214, 314 of FIGS. 1-3, respectively. The cloud computing environment 1300 comprises cloud computing services 1310. The cloud computing services 1310 can comprise various types of cloud computing resources, such as computer servers, data storage repositories, networking resources, etc. The cloud computing services 1310 can be centrally located (e.g., provided by a data center of a business or organization) or distributed (e.g., provided by various computing resources located at different locations, such as different data centers and/or located in different cities or countries).

The cloud computing services 1310 are utilized by various types of computing devices (e.g., client computing devices), such as computing devices 1320, 1322, and 1324. For example, the computing devices (e.g., 1320, 1322, and 1324) can be computers (e.g., desktop or laptop computers), mobile devices (e.g., tablet computers or smart phones), or other types of computing devices. For example, the computing devices (e.g., 1320, 1322, and 1324) can utilize the cloud computing services 1310 to perform computing operators (e.g., data processing, data storage, and the like). The computing devices 1320, 1322, 1324 can correspond to a local system 110, 210, 310 of FIGS. 1-3, respectively, or can represent a computing device in which the architecture 500 of FIG. 5 is implemented.

Example 13—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 12, computer-readable storage media include memory 1220 and 1225, and storage 1240. The term computer-readable storage media does not include signals and carrier waves. In addition, the term computer-readable storage media does not include communication connections (e.g., 1270).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C, C++, C #, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims

What is claimed is:

1. A computing system comprising:
   memory;
   one or more hardware processing units coupled to the memory; and
   one or more computer readable storage media storing instructions that, when executed, cause the computing system to perform operations comprising:
      at the computing system, defining a machine learning task to provide a definition of the machine learning task, the machine learning task using training data located on one or more remote computing systems;
      at the computing system, including in the definition of the machine learning task an identifier for at least one artefact of a virtual data model on a first remote computing system of the one or more remote computing systems, the at least one artefact of a virtual data model comprising a selection of data from one or more artefacts of the first remote computing system and (1) an annotation indicating that data extraction using the at least one artefact of a virtual data model has been enabled, or (2) an annotation indicating a change propagation technique;

at the computing system, sending a data request to the first remote computing system, wherein:
(1) when the at least one artefact of the virtual data model comprises an annotation indicating that data extraction using the at least one artefact of the virtual data model has been enabled, the first remote computing system processes the data request, determines that the annotation indicates that data extraction has been enabled, and requests data from the one or more artefacts of the first remote computing system at least in part using the selection of data; or
(2) when the at least one data artefact of the virtual data model comprises an annotation indicating a change propagation technique, the first remote computing system determines that a change to data identified by the selection of data has occurred in at least one artefact of the one or more artefacts of the first remote computing system and sends changed data to the computing system according to the change propagation technique;

at the computing system, receiving data for the at least one artefact of the virtual data model from the first remote computing system;

at the computing system, processing at least a portion of the received data using a machine learning algorithm to provide a trained model; and at the computing system, storing the trained model.

2. The computing system of claim 1, wherein the at least one artefact of the virtual data model specifies at least one attribute of at least one artefact of the one or more artefacts that should be monitored for changes in a date or timestamp associated with values of the at least one attribute in the at least one artefact.

3. The computing system of claim 1, wherein the at least one artefact of the virtual data model is associated with at least one relational database artefact, and a trigger is placed on the at least one relational database artefact in response to the annotation indicating a change propagation technique.

4. The computing system of claim 1, wherein receiving data for the at least one artefact of the virtual data model comprises retrieving data from a queue maintained by the first remote computer system.

5. The computing system of claim 4, wherein the queue is associated with a table tracking data read by the first computing system.

6. The computing system of claim 1, wherein the machine learning task is defined using a machine learning scenario, the machine learning scenario comprising the identifier for the at least one data artefact of the virtual data model and an identifier for a machine learning algorithm to be used to process data from the at least one artefact of the virtual data model.

7. The computing system of claim 6, wherein the machine learning scenario further comprises an identifier for an inference processor to be used in analyzing results provided using the trained model.

8. The computing system of claim 1, wherein the data is persisted on the computing system.

9. The computing system of claim 1, wherein the data is used on the fly in the processing the at least a portion of the received data.

10. The computing system of claim 9, wherein the data is not persisted by the computing system after using the data on the fly.

11. The computing system of claim 1, wherein the data is first data received at a first time, the operations further comprising:
receiving second data for the at least one data artefact of the virtual data model from the first remote computer system at a second time, the second data consisting of data changed as compared with the first data.

12. The computing system of claim 1, the operations further comprising:
receiving a request to use the trained model, the request comprising input data;
processing the input data using the trained model to provide a result; and
returning the result in response to the request.

13. The computing system of claim 12, wherein the request is received from the first remote computing system.

14. A method, implemented in a computing system comprising a memory and one or more processors, comprising:
at the computing system, defining a machine learning task to provide a definition of the machine learning task, the machine learning task using training data located on one or more remote computing systems;
at the computing system, including in the definition of the machine learning task an identifier for at least one artefact of a virtual data model on a first remote computing system of the one or more remote computing systems, the at least one artefact of a virtual data model comprising a selection of data from one or more artefacts of the first remote computing system and (1) an annotation indicating that data extraction using the at least one artefact of the virtual data model has been enabled, or (2) an annotation indicating a change propagation technique;
at the computing system, sending a data request to the first remote computing system, wherein:
(1) when the at least one artefact of the virtual data model comprises an annotation indicating that data extraction using the at least one artefact of the virtual data model has been enabled, the first remote computing system processes the data request, determines that the annotation indicates that data extraction has been enabled, and requests data from the one or more artefacts of the first remote computing system at least in part using the selection of data; or
(2) when the at least one data artefact comprises an annotation indicating a change propagation technique, the first remote computing system determines that a change to data identified by the selection of data has occurred in the at least one artefact of the one or more artefacts of the first remote computing system and sends changed data to the computing system according to the change propagation technique;
at the computing system, receiving data for the at least one artefact of the virtual data model from the first remote computing system;
at the computing system, processing at least a portion of the received data using a machine learning algorithm to provide a trained model; and
at the computing system, storing the trained model.

15. The method of claim 14, wherein the machine learning task is defined using a machine learning scenario, the machine learning scenario comprising the identifier for the at least one data artefact of the virtual data model and an identifier for a machine learning algorithm to be used to process data from the at least one artefact of the virtual data model.

16. The method of claim 15, wherein the machine learning scenario further comprises an identifier for an inference processor to be used in analyzing results provided using the trained model.

17. One or more computer-readable storage media storing:

computer-executable instructions that, when executed by a first computing system comprising at least one hardware processor and at least one memory coupled to the at least one hardware processor, cause the first computing system to define a machine learning task to provide a definition of the machine learning task, the machine learning task using training data located on one or more remote computing systems;

computer-executable instructions that, when executed by the first computing system, cause the first computing system to include in the definition of the machine learning task an identifier for at least one artefact of a virtual data model on a first remote computer system of the one or more remote computing systems, the at least one artefact of a virtual data model comprising a selection of data from one or more artefacts of the first remote computing system and (1) an annotation indicating that data extraction using the at least one artefact of the virtual data model has been enabled, or (2) an annotation indicating a change propagation technique;

computer-executable instructions that, when executed by the first computing system, cause the first computing system to send a data request to the first remote computing system, wherein:

(1) when the at least one artefact of the virtual data model comprises an annotation indicating that data extraction using the at least artefact of the virtual data model has been enabled, the first remote computing system processes the data request, determines that the annotation indicates that data extraction has been enabled, and requests data from the one or more artefacts of the first remote computing system at least in part using the selection of data; or (2) when the at least one data artefact comprises an annotation indicating a change propagation technique, the first remote computing system determines that a change to data identified by the selection of data has occurred in the at least one artefact of the first remote computing system and sends changed data to the computing system using the change propagation technique;

computer-executable instructions that, when executed by the first computing system, cause the first computing system to receive data for the at least one artefact of the virtual data model from the first remote computing system;

computer-executable instructions that, when executed by the first computing system, cause the first computing system to process at least a portion of the received data using a machine learning algorithm to provide a trained model; and computer-executable instructions that, when executed by the first computing system, cause the first computing system to store the trained model.

\* \* \* \* \*